May 29, 1956     K. RUTHARDT     2,747,679
RECOVERY OF PLATINUM IN CATALYTIC GAS REACTIONS
Filed Jan. 23, 1953
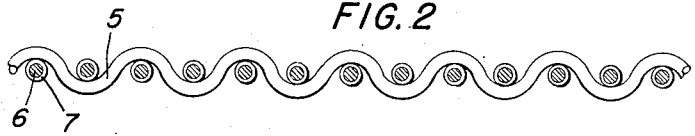
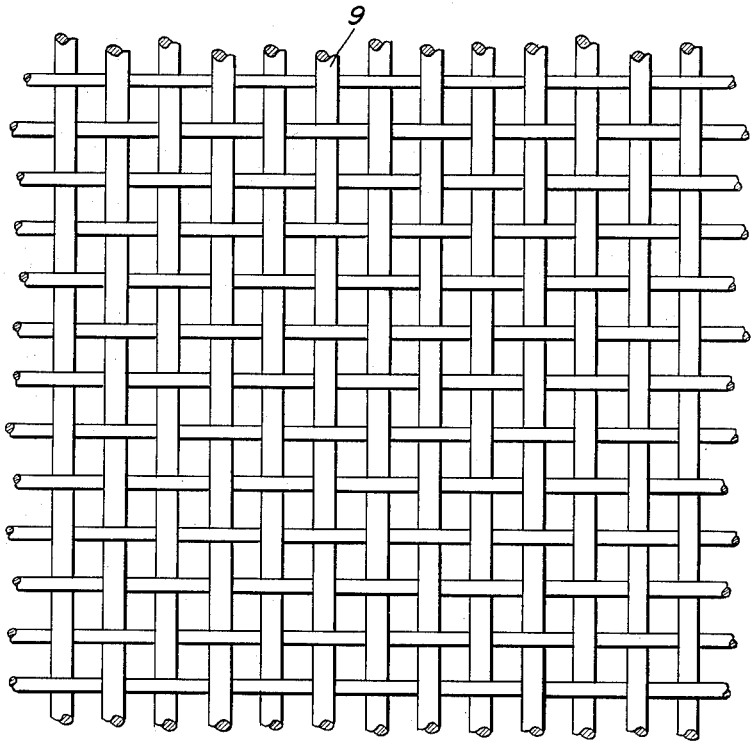
INVENTOR
KONRAD RUTHARDT
BY
ATTORNEY

United States Patent Office 2,747,679
Patented May 29, 1956

2,747,679

RECOVERY OF PLATINUM IN CATALYTIC GAS REACTIONS

Konrad Ruthardt, Hanau (Main), Germany, assignor to W. C. Heraeus G. m. b. H., Platinschmelze, Hanau (Main), Germany Application January 23, 1953, Serial No. 332,999

Claims priority, application Germany January 29, 1952

9 Claims. (Cl. 183—1)

Platinum and its alloys such as platinum-rhodium are widely employed as catalysts in gas reactions carried out at elevated temperatures, for example in the technical oxidation of ammonia and in the Andrussow process for the production of prussic acid. Considerable quantities of the expensive catalyst metal are normally lost in long-term operation by being carried away by the reacting gas.

With a view to counteracting the loss involved, it has already been attempted to recover the platinum from the gas by various methods; thus filters, for example of glass wool, quartz wool or metal wool, have been arranged in the path of the gas which has passed the catalysts which preferably have the form of nets, in order to retain the precious-metal particles carried away. It has also been proposed, in addition to purely mechanically holding back the precious-metal particles, to utilise the alloy formation of platinum with gold, by providing the filter elements with a gold coating. Finally a simplified form of this method has been proposed according to which the gold is employed in the form of wire net or gauze, or even by providing net or gauze of non-precious metal coated with a layer of fine gold, a barrier layer of silver or metal oxides being in some cases arranged between the base-metal core and the precious-metal coating. Even when wire net was employed, only precious metals have hitherto been proposed to be used as active substances, and the desirable qualities of these substances as compared with base-metal alloys such as nickel-chromium alloys have been generally emphasised, the latter being of much smaller effect than the former.

From an economical point of view it obviously cannot be said to be desirable that in order to permit recovery of the precious-metal platinum additional costs must be incurred for the arrangement of gold wire nets with a risk that in operation and in the working up certain losses of this second precious-metal may in turn occur. It is therefore an object of the present invention to avoid the necessity of using precious-metals to permit the recovery of the platinum escaping in catalytic gas reactions.

Other objects and advantages will be apparent from the description hereinafter following and the drawings forming a part hereof, in which:

Figure 1 shows a partly elevational, and partly cross-sectional view of individual wires in woven arrangement, Figures 2 and 3 are views similar to Figure 1 showing modifications in the wire composition, and Figure 4 illustrates a top view of a wire screen.

According to Figure 1, the individual wires 1 are provided with a metal layer 2, e. g. titanium, on a wire core 3 of any other suitable metal, or glass or quartz, and with an intermediate coating 4 therebetween for improved adhesion of the layer onto the core, or, if the core is metal, for the prevention of diffusion of the outer metal to the core.

According to Figure 2, the wires 5 consist of an inner core 6 with an outer coating 7 of a metal of the 4th and 5th groups of the periodic system, or compounds thereof, preferably the oxides thereof.

According to Figure 3, the wire 8 is composed entirely of a metal of the 4th and 5th groups of the periodic system.

My solution of this problem is based on the remarkable discovery that in these catalytic gas reactions platinum may also be kept back by base metals or alloys of base metals, provided that base metals are used which have a high affinity to platinum.

According to the invention accordingly there are connected in series behind the catalysts consisting of platinum or platinum alloys gas pervious arrangements which contain temperature resistant base metals, or alloys of temperature-resistant base metals, having a high affinity to platinum. Such base metals or base-metal alloys should be selected for use as will resist satisfactorily the temperature and the chemical action of the gas mixture leaving the catalyst. Thus, for example, in the technical oxidation of ammonia substances resistant to nitric acid should be selected.

It has been found that for this purpose metals of the 4th and 5th groups of the periodic system and compounds of such metals are particularly suitable, semi-metals such as silicon being counted as metals for the purpose of this invention.

Instead of using the metals themselves, a great variety of compounds may be employed provided that they have sufficient temperature resistance to the gases leaving the catalyst.

In the technical oxidation of ammonia the use of titanium, silicon, tin or antimony has been found particularly satisfactory, and amongst the temperature-resistant and chemically resistant compounds of these elements more particularly their oxides.

In order to carry out the invention, the said substances may be applied to a gas-pervious temperature-resistant support, for example to a porous base of glass, quartz, or metal wool, or on suitably formed sieves (e. g. perforated metal), nets, e. g. wire netting, or the like.

In this case they may be arranged in loose form, if desired in mixture with other substances, and the carrier together with the substances holding back the platinum may be accommodated in suitably shaped containers, for example cylinders. The base metals and their alloys which according to the invention serve to hold back the platinum may in many cases alternatively be precipitated direct upon the metallic sieves or nets or in a given case precipitated thereon with the interposition of intermediate layers; precipitation upon a non-metallic base such as filaments of glass, quartz, or ceramic material may also be effected in known per se manner.

The general arrangement of the apparatus is similar to that used in the known methods and will be therefore readily understood from the following brief indication. In order to recover platinum in the technical oxidation of ammonia, the carrier for the substances employed according to the invention for the recovery may, for example, be arranged in a similar manner as the various kinds of filters of glass wool, ceramic wool, or metal wool, that have hitherto been used for the recovery of platinum in the technical ammonia oxidation. When employing nets or sieves being directly provided with a coating of the base metals according to the invention, the same arrangement may be employed as in the case of the gold coated nets known in the art, intermediate layers being if desired also employed. The arrangement is generally advantageously accommodated at a point at which the temperature of the gas is still sufficiently high to prevent precipitation by condensation of liquids such as water from the catalytically transformed gases.

The invention offers the additional advantage that contrary to the case of gold, there is no need of a quantitative recovery of the base metals employed, thus making it possible for the separation to be controlled entirely with a view to complete recovery of the valuable platinum while only part of the base metals is recovered or the latter are abandoned altogether.

I claim:

1. In the recovery of platinum used at least as a component of a platinum containing catalyst in a catalytic gas reaction carried out at elevated temperature, the connection in series behind the catalyst of a gas-pervious arrangement having a surface consisting of at least one base metal of the 4th and 5th groups of the periodic system which are temperature-resistant and resistant to the passing gases.

2. In the recovery of platinum used as at least a component of a platinum containing catalyst in a catalytic gas reaction carried out at elevated temperature, the connection, in series behind the catalyst, of a gas-pervious arrangement having a surface consisting of a compound of a base metal out of the 4th and 5th groups of the periodic system, which is temperature-resistant and resistant to the passing gases.

3. In the recovery of platinum used as at least a component of a platinum-containing catalyst in a catalytic gas reaction carried out at an elevated temperature, the connection, in series behind the catalyst, of a gas-pervious arrangement having a surface consisting of an oxide of a base metal out of the 4th and 5th groups of the periodic system which is temperature-resistant and resistant to the passing gases.

4. In the recovery of platinum used as at least a component of a platinum-containing catalyst in a catalytic gas reaction carried out at an elevated temperature, the connection, in series behind the catalyst, of a gas-pervious arrangement having a surface consisting of titanium.

5. In the recovery of platinum used as at least a component of a platinum-containing catalyst in a catalytic gas reaction carried out at an elevated temperature, the connection in series behind the ctalyst of a gas-pervious arrangement having a surface consisting of an oxide of titanium.

6. In the recovery of platinum used as at least a component of a platinum-containing catalyst in a catalytic gas reaction carried out at an elevated temperature, the connection, in series behind the ctalyst, of a gas-pervious arrangement having a surface consisting of tin.

7. In the recovery of platinum used as at least a component of a platinum-containing catalyst in a catalytic gas reaction carried out at an elevated temperature, the connection, in series behind the catalyst, of a gas-pervious arrangement having a surface consisting of an oxide of tin.

8. In the recovery of platinum used as at least a component of a platinum-containing catalyst in a catalytic gas reaction carried out at an elevated temperature, the connection, in series behind the catalyst, of a gas-pervious arrangement containing antimony.

9. In the recovery of platinum used as at least a component of a platinum-containing catalyst in a catalytic gas reaction carried out at an elevated temperature, the connection, in series behind the catalyst, of a gas-pervious arrangement containing an oxide of antimony.

References Cited in the file of this patent

UNITED STATES PATENTS

| | | |
|---|---|---|
| 2,226,113 | Chastain | Dec. 24, 1940 |
| 2,226,149 | Zeramerman | Dec. 24, 1940 |
| 2,648,393 | Holzmann | Aug. 11, 1953 |